United States Patent

[11] 3,568,795

| [72] | Inventors | John T. McGough<br>Cocoa Beach;<br>Robert A. McDaris, Merritt Island; Charles R. Billings, Cocoa Beach, Fla.; Paul F. Neal, Clark Air Force Base, Philippines; James C. Sweat, Merritt Island, Fla. |
|---|---|---|
| [21] | Appl. No. | 672,384 |
| [22] | Filed | Oct. 2, 1967 |
| [45] | Patented | Mar. 9, 1971 |
| [73] | Assignee | The United States of America as represented by the Administration of the National Aeronautics and Space Administration |

[54] EMERGENCY ESCAPE SYSTEM
3 Claims, 8 Drawing Figs.

[52] U.S. Cl. .................................................. 182/10, 188/65.5
[51] Int. Cl. ................................................... B61b 7/20
[50] Field of Search ...................................... 188/65.1–65.5; 182/5, 10, 11, 13

[56] References Cited
UNITED STATES PATENTS

| 1,087,440 | 2/1914 | Freed ........................ | 188/65.5X |
| 1,556,555 | 10/1925 | Brown ....................... | 188/65.5X |
| 1,935,711 | 11/1933 | Hecox et al. ............... | 182/11 |
| 2,410,765 | 11/1946 | Von Hagen ................ | 188/65.1X |

Primary Examiner—George E. A. Halvosa
Attorneys—James O. Harrell, G. T. McCoy and William H. King ABSTRACT: An automatic braking device for preattachment to a cable connected between high and low elevational points to provide an emergency escape system. The braking device and cable are so arranged that as a person using the emergency escape system descends from the high elevational point, the slope of the cable causes the angle of the braking device to change in relation to the cable thereby effectuating gradual stopping of the person as he approaches the lower elevational point.

PATENTED MAR 9 1971
3,568,795
SHEET 1 OF 4
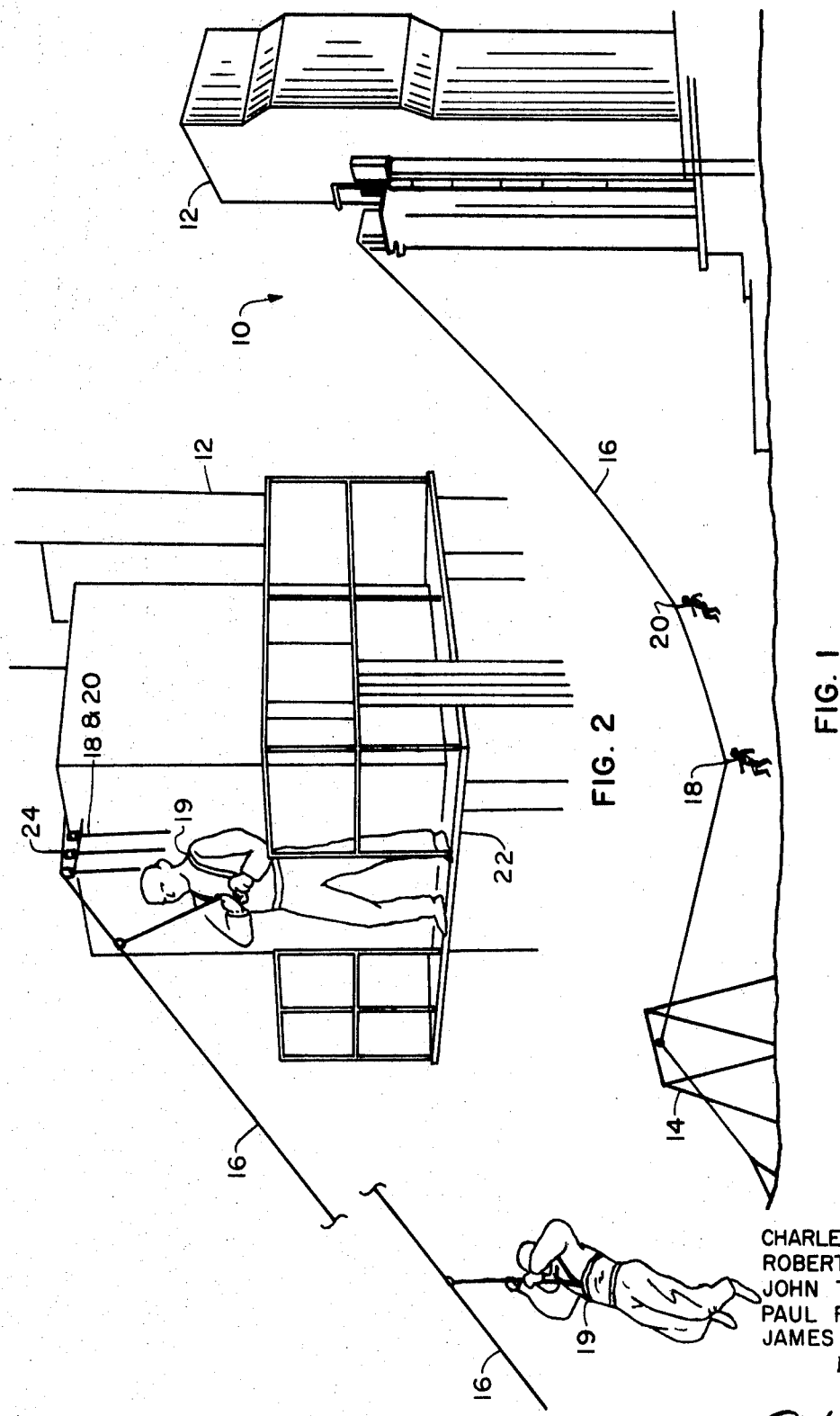
CHARLES R. BILLINGS
ROBERT A. McDARIS
JOHN T. McGOUGH
PAUL F. NEAL
JAMES C. SWEAT
INVENTORS
BY
ATTORNEYS CHARLES R. BILLINGS
ROBERT A. McDARIS
JOHN T. McGOUGH
PAUL F. NEAL
JAMES C. SWEAT

INVENTORS

BY *[signature]*
*William H. King*
ATTORNEYS

CHARLES R. BILLINGS
ROBERT A. McDARIS
JOHN T. McGOUGH
PAUL F. NEAL
JAMES C. SWEAT

INVENTORS

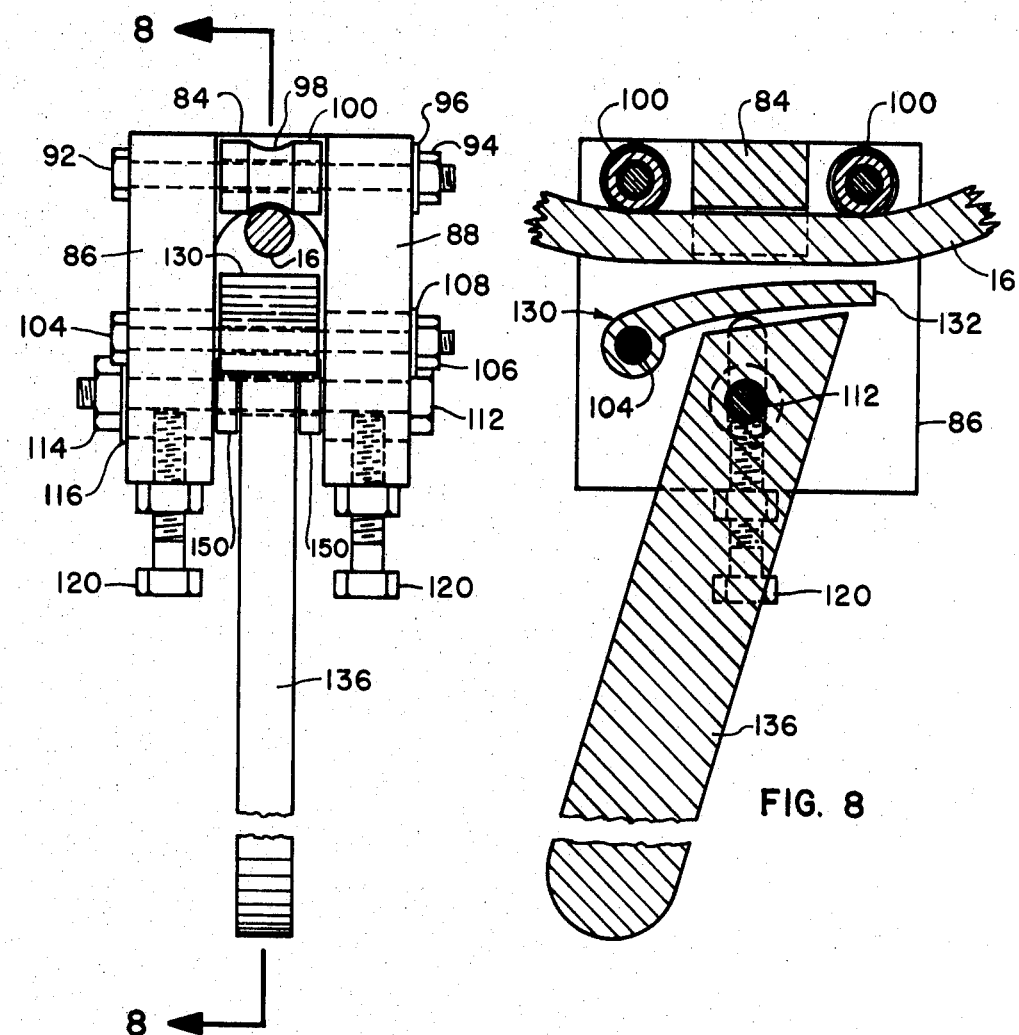

EMERGENCY ESCAPE SYSTEM

SPECIFICATION

The invention described herein was made by employees of the United States Government and may be manufactured and used by or for the Government for government purposes without the payment of any royalties thereon or therefor.

This invention relates generally to an escape system and more particularly to an automatic braking device for rapidly transfering persons or material from an elevated location.

Various methods and apparatus have been utilized previously for the transfer of persons and materials from a tower or other elevated locations under both normal and emergency operational procedures. These known devices generally required knowledge and experience for proper and safe use. For example, one such device requires the operator to hold himself in a sling while operating a handbrake to control his rate of descent. This device is quite large which limits the number that can be preattached for emergency use. Furthermore, the operator must be in complete physical control of himself at all times in order to prevent injury. Other devices have been utilized for emergency departures from elevated locations that require some type of safety car or other enclosure and generally have a counterweight to assist in reduction of the rate of descent. Such devices are cumbersome, difficult to maintain and prevent access and rapid transfer of a number of persons in a short period. Conversely, relatively small devices are known for use in safety rigging, but these merely stop a fall and cannot be utilized for transfer of persons and material. Moreover, these devices normally feature sudden braking and require complete physical control by the operator. Some of the known braking devices are capable of transfering articles or individuals, but depend upon weight for the amount of braking and are not adaptable for transfers from relatively high locations.

In order to overcome the disadvantages of the prior art, the instant invention contemplates a compact, simple and easily maintained device supported by a cable extending from an elevated location to a lower location. The person or weight is supported from a lever that determines the angular relationship between the cable, the support in the device and the braking structure. This angular relationship determines the braking force applied against the cable and thereby provides automatic braking. The braking structure may be in the form of a fixed and an adjustable bolt or relay on a pressure arm associated with the lever for application of the braking force.

It is an object of the instant invention to provide a simple, compact, and reliable emergency escape device.

Another object of this invention is to provide an emergency escape system utilizing an automatic self-braking mechanism on a fixed cable.

Still another object of the instant invention is to provide a slide-wire escape system for rapidly transfering personnel or materials from an elevated location along a sloped cable thereby effecting horizontal displacement as well as vertical descent.

A still further object of this invention is to provide a slide-wire escape mechanism especially adapted for a steeply sloping cable and having an adjustable support bolt and a fixed pressure bolt extending across a channel member with a lever arm extending downwardly therefrom for attachment to the person to be transferred so that, as the angle of the cable upon which the mechanism is supported decreases, the cable will come in contact with the pressure bolt causing a twist in the cable and forcing the device to a smooth, but rapid, stop.

Still another object of the instant invention is to provide a cam and pressure arm pivoted between the flanges of an inverted channel member with a pair of rollers mounted for support of the channel from a relatively shallowly sloped cable, so as the device descends along the cable, the cam changes the angular relationship of the pressure arm to the cable to apply a steady and increasing pressure to the cable through the pressure arm and thus automatically stop the device at a predetermined point along the cable.

A more complete appreciation of the invention and many of the attendant advantages thereof will be readily apparent as the same becomes better understood by references to the following description when considered in connection with the accompanying drawings wherein:

FIG. 1 is a schematic of an escape system incorporating the instant invention;

FIG. 2 is an enlarged isometric view of a portion of the system of FIG. 1;

FIG. 7 is an end view of the embodiment of the invention shown in FIG. 6; and

FIG. 8 is a sectional view of the embodiment of FIG. 6 taken on line 8–8 of FIG. 7.

Figure 3:
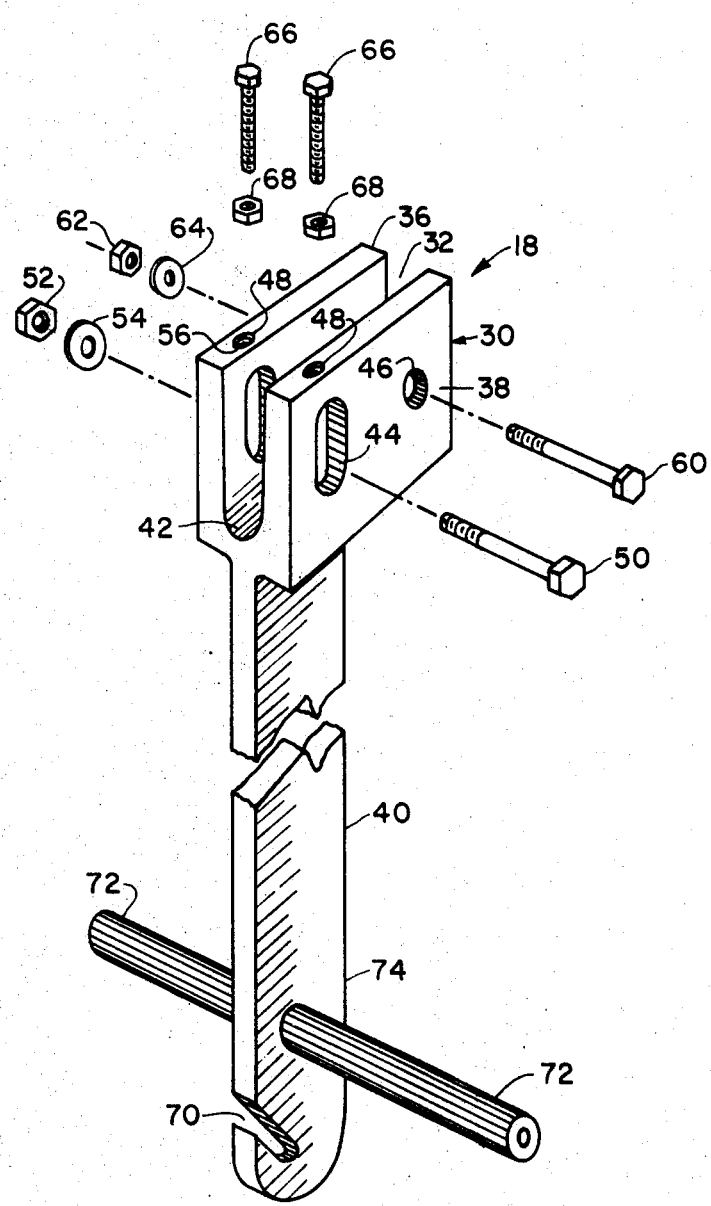
FIG. 3 is an exploded isometric view of one embodiment of the instant invention.

Referring now to the drawings and more particularly to FIGS. 1 and 2 wherein emergency escape system 10 is shown to include tower or elevated location 12 and lower location or A-frame 14 between which cable 16 is connected. In this construction cable 16 runs from tower 12 toward the ground or lower location on approximately a 4½: 1 slope. Although this ratio is not critical, it is in the preferable range of from 4 to 5 to 1 for the slope of the cable. Braking devices or mechanisms 18 and 20 are shown supporting a person being transferred from platform 22 on tower 12 to the ground. A plurality of cable attachments 24 are shown at the upper end of cable 16 adjacent tower 12 for a purpose to be more fully understood hereinafter.

Figure 4:
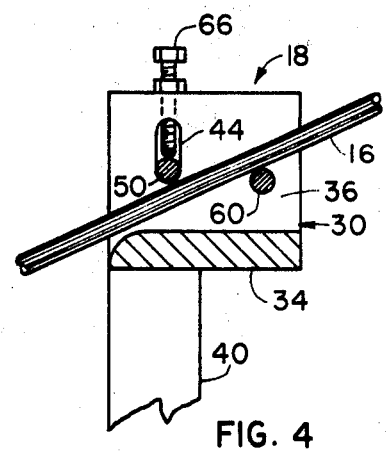
FIG. 4 is a sectional view showing the device of FIG. 3 in position prior to initiation of operation.
Figure 5:
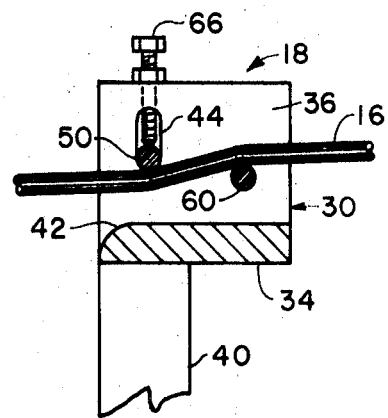
FIG. 5 is a sectional view of the device of FIG. 3 during operation.

Referring now to FIGS. 3—5 twist lever slide device 18 includes block or channel 30 with groove 32 extending longitudinally therethrough to form base 34 and upstanding flanges 36 and 38. Lever arm 40 may be integral with base 34 or rigidly affixed thereto at the forward or down-cable end of channel 30. The upper, forward surface of base 34 is rounded at 42 to prevent damage to cable 16 during operation of slide device 18. Slots 44 in flanges 36 and 38 are substantially vertically oriented above lever arm 40 adjacent to, but spaced from, the forward end of channel 30. Spaced from slots 44 and the rearward end of block member 30 are apertures 46. Bores 48 extending downwardly from the upper edge of flanges 36 and 38 communicate with the top portion of slots 44 and may have threads 56 if so desired as will become apparent hereinafter.

Support bolt 50 extends through slots 44 and across groove 32 between flanges 36 and 38. Nut 52, with washer 54, is utilized for retaining bolt 50 in channel 30. Pressure bolt 60 extends through apertures 46 in the rearward portion of flanges 36 and 38, and is secured across channel 30 by nut 62 and washer 64 to function as a braking member on cable 16 when the angular relationship between bolts 50 and 60 has become sufficiently great with reference to cable 16. Vertical adjustment screws 66 may threadingly engage threads 56 in bores 48, as well as nuts 68 which are rigidly affixed to the upper edges of flanges 36 and 38 around bores 48. Lever arm 40 is provided adjacent the lower end thereof with a downwardly extending slot 70. Slot 70 is in the forward edge of arm 40 in order for a person intending to use device 18 to rapidly attach a hook on the harness, not shown, he is waring onto lever arm 40. Handle 72 may be secured to the sides of arm 40 as by welding at 74 in order to assist the person using device 18 to maintain stability. It is to be understood that handle 72 may extend through an aperture in arm 40 and weld 74 utilized for securing handle 72 in its proper position.

Figure 6:
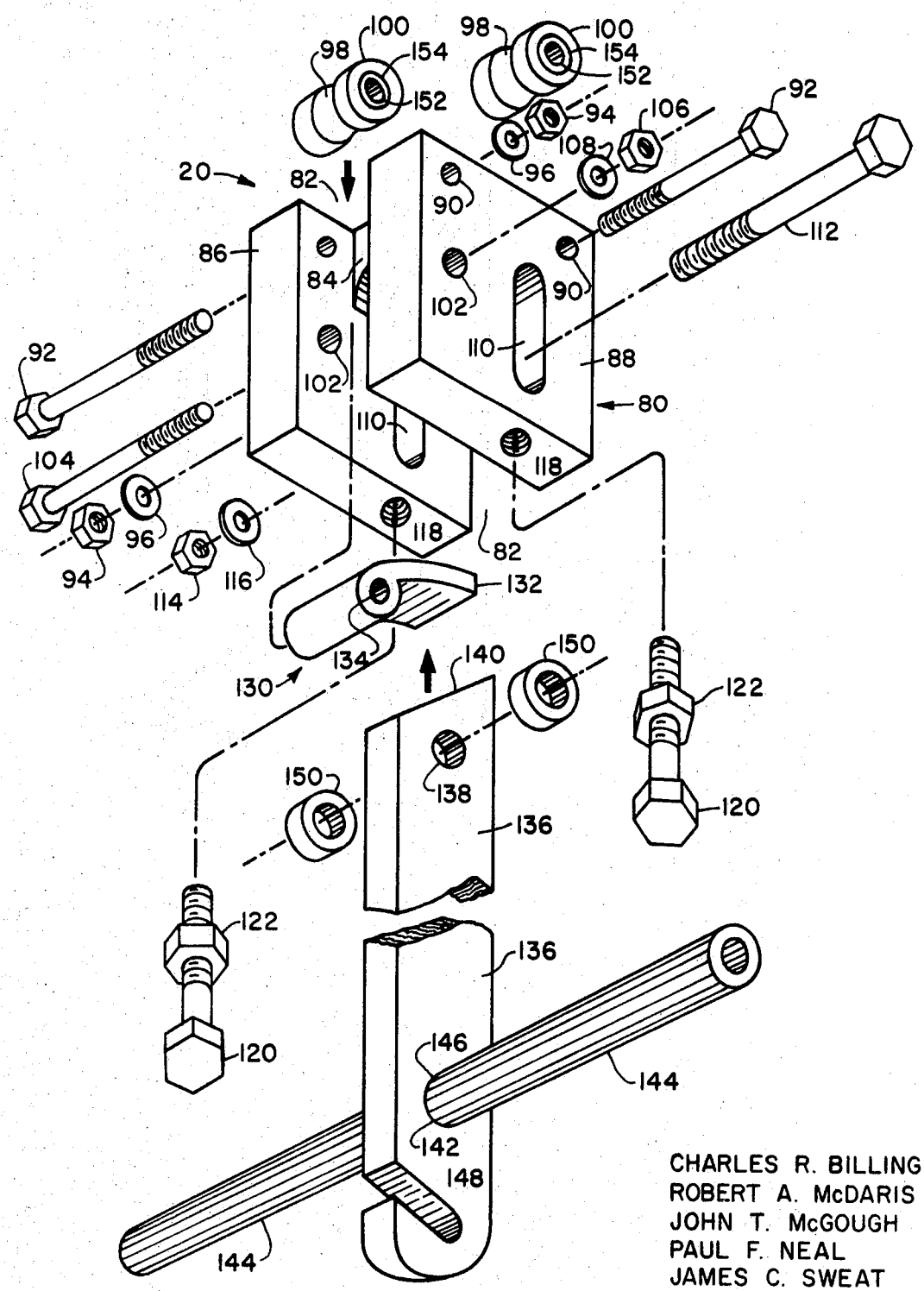
FIG. 6 is an exploded isometric view of an alternative embodiment of the instant invention.

Referring now to FIGS. 6—8 wherein alternative embodiment 20 of the instant invention is shown to include block or channel 80 having groove 82 between flanges 86 and 88 connected by member 84. Base 84 is of less length than flanges 86 and 88 to permit location of a pair of support rollers 100 while maintaining braking device 20 compact. Each of flanges 86 and 88 has a pair of apertures 90 extending therethrough between the forward and rearward edges of flanges 86 and 88 and base 84. Apertures 90 receive roller bolts 92 which support rollers 100 between flanges 86 and 88. Nuts 94 and washers 96 are utilized in securing bolts 92 to flanges 86 and 88. Since rollers 100 support braking mechanism 20 on cable 16, arcuate depressions 98 are utilized for retaining cable 16 centrally of flanges 86 and 88 and are so located as to prevent contact between cable 16 and base 84.

Each of flanges 86 and 88 also has an aperture 102 for receiving pressure arm bolt 104 that is secured to flanges 86 and 88 by nut 106 and washer 108. As is easily seen in FIG. 6, apertures 102 are located in the forward portion of flanges 86 and 88 and spaced below forward apertures 90. Each of flanges 86 and 88 has a substantially vertical slot 110 in the rearward portion that is spaced slightly below and forward of rearward aperture 90. Slots 110 receive cam bolt 112 that extends across groove 82 and is secured to flanges 86 and 88 by nuts 114 and washer 116 for a purpose to be more fully understood from the description hereinafter. Threaded bores 118 extend substantially vertically from the lower edges of flanges 86 and 88 into the lower portion of slots 110. Adjustment screws 120 threadingly engage bores 118 and nuts 122 and extend into slots 110 under cam bolt 112 to permit vertical adjustment of the location of bolt 112 for a purpose to be described more fully hereinafter. Nuts 122 receive adjustment bolts 120 and are secured on the lower edges of flanges 86 and 88 about bores 118 to function as locknuts and prevent undesirable adjustment of bolts 120.

Floating pressure arm 130, pivotally mounted on pressure bolt 104 between flanges 86 and 88, is substantially horizontally planar and vertically arcuate. That is, pressure arm flange 132 is arcuate in a vertical plane while being substantially linear horizontally as is pivot bore 134 that mounts pressure arm 130 on pressure bolt 104. Pressure arm flange 132 is generally of uniform thickness and, therefore, the lower face also is arcuate, see FIG. 6.

Lever arm 136 is bar shaped and extends downwardly from channel 80 and has aperture 138 adjacent to, but spaced from, beveled end or cam face 140 which is on the upper end of lever arm 136. Aperture 142 extends through lever 136 for receiving handle 144 which could be secured as by welding at 146. Slot 148 extends inwardly and downwardly from the forward edge of attachment lever arm 136 adjacent the lower end thereof to receive the hook on the harness, not shown, worn by the person using braking mechanism 20. Lever 136 and spacers 150 are mounted on cam bolt 112 which extend through central bore 154 in spacers 150, aperture 138 and slots 110. Such an arrangement insures the central location of lever arm 136 between flanges 86 and 88 of channel 80 and that the weight attached to arm 136 is directly below cable 16 which is centered by depression 98 in rollers 100. It is to be noted that in some installations it may be desirable to provide bearings 152 around central bores 154 in rollers 100 in order to prevent undue wear or deterioration of rollers 100 or roller bolts 92.

OPERATION

Twist lever slide device 18 or floating arm slide device 20 is mounted on cable 16 near elevated platform 22 on tower 12. Slide devices 18 and 20 are held in place by cable attachments 24, such for example as strings secured between tower 12 and a slide device. When a situation arises for need of an emergency egress from tower 12, personnel wearing a sling-type harness 19 will move to platform 22 and attach a conventional hook, not shown, on the harness 19 to lever arm 40 or 136, depending on which slide device is being used. When the individual using the device steps from the platform, his weight will break string attachment 24 and descent along cable 16 will be automatic.

Referring now to slide device 18, FIGS. 3—5, it is seen that cable 16 extends under support bolt 50 and over braking pressure bolt 60. The relative location of bolts 50 and 60 to one another is dependent upon the general slope of cable 16 and the initial clearance setting between cable 16 and pressure bolt 50. However, adjustment screws 66 permit rapid alteration of the clearance between cable 16 and pressure bolt 60 once the point at which it is desired to stop the person has been determined. Field experimentation will quickly determine proper adjustment screw 66 settings for each installation to effect stopping at a predetermined point. As slide device 18 descends, its angle of suspension on cable 16 remains substantially constant because of the load suspended on lever arm 40. Cable 16 has a decreasing angle of slope and, as the slope decreases, braking pressure bolt 60 gradually exerts greater force against the cable and tends to twist it causing slide device 18 to smoothly, but relatively rapidly, stop at the predetermined point on the ground. The length of attachment lever arm 40 controls to a slight degree the stopping force applied and merits some consideration when making adjustments in that the greater the length of arm 40, the greater the rapidity with which pressure bolt 60 exerts the twisting force on cable 16.

Floating pressure arm slide device 20, FIGS. 6—8, operates in much the same manner as slide device 18. Slide device 20 is preattached to fixed cable 16 by string attachments 24 and is supported on the cable by rollers 100. Cable 16 extends through groove 82, in contact with depressions 98 on rollers 100 and in close proximity to pressure arm 130 which pivots about bolt 104. The person utilizing slide device 20 attaches the harness hook, nor shown, in slot 148 of lever arm 136, thereby applying a suspended load which breaks string attachment 24 and releases the device. Lever arm 136 is mounted on cam bolt 112 between spacers 150. Since bolt 112 is located in slots 110 by adjustment screws 120, the distance between cable 16 and pressure arm 130 can be altered. Cam face 140 of arm 136 bears against the under surface of pressure arm flange 132 and presents a factor to be considered in making adjustment for any given installation. Thus it is seen that the length of pressure arm flange 132 and the distance cam face 140 is located from cable 16 will determine the amount of pressure applied to the cable and, therefore, the point at which slide device 20 will automatically stop. Preferably, the angle of beveled end 140 is set at the same angle as the slope of cable 16 at the starting or elevated end. As slide device 20 descends, the angle of cam face 140 changes with relation to the angle of cable 16 because the cable is approaching the horizontal. As this angular relationship is changed, beveled end 140 forces the upper surface of pressure arm flange 132 against the lower surface of cable 16 with a steady and ever increasing pressure until slide device 20 stops at the predetermined point.

The above description of the operation of the instant invention provides general examples giving a clear indication of the simple, compact and reliable emergency escape system. It is readily apparent that fail-safe redundancy can be built into the device by providing secondary support members and perhaps even secondary braking mechanisms. The instant invention requires little or no maintenance and is sufficiently compact as to allow preattachment of many devices that are immediately available in the event of an emergency. An injured or unconscious person can be attached to the device and safely transferred from the hazardous area. Moreover, the automatic braking eliminates human panic which might stop other devices too soon causing subsequent users to collide with the operator or not stopping soon enough to prevent colliding with the ground or lower end and causing personal injury.

Obviously, many modifications and variations of the subject invention are possible in light of the above teachings.

I claim:

1. An emergency escape system comprising, in combination; a lower cable having an upper end secured to a high elevational point and a lower end secured to a low elevational point; said cable having a steep slope adjacent said upper end and gradually approaching horizontal toward said lower end; block means slidably attached to said cable; braking means disposed in said block means for sliding and preselected contact with said cable; and adjustment means on said block means for adjusting and preselecting the relationship between said braking means and said cable; said steep slope being in the range of 4—5 to 1 adjacent said upper end of said cable; and said block means being preattached on said cable adjacent said high elevational point by string means which will break upon attachment of a weight to said block means; whereby, as said block means descends, the slope of said cable causes the angle of said braking means to automatically change in relation to said cable thereby applying a steady and ever-increasing pressure to said cable to effect gradual automatic stopping of said block means as it approaches the horizontal portion of said cable.

2. An emergency escape system comprising, in combination; a cable having an upper end secured to a high elevational point and a lower end secured to a low elevational point, said cable having a steep slope adjacent said upper end and gradually approaching horizontal toward said lower end; block means slidably attached to said cable; said block means comprises an inverted channel having a base and flanges and a pair of rollers mounted in said channel adjacent said base for supporting said block means on said cable; braking means disposed in said block means for sliding and preselected contact with said cable; said braking means comprises a pressure arm pivotally disposed between said flanges and a lever arm pivotally mounted between said flanges for operating said pressure arm; and adjustment means on said block means for adjusting and preselecting the relationship between said braking means and said cable; whereby, as said block means descends, the slope of said cable causes the angle of said braking means to automatically change in relation to said cable thereby applying a steady and ever-increasing pressure to said cable to effect gradual automatic stopping of said block means as it approaches the horizontal portion of said cable.

3. The emergency escape system as defined in claim 2 wherein said base is of less length than said flanges; said pair of rollers are mounted between said flanges adjacent said base; said pressure arm has a slightly arcuate upper surface for contacting said cable; each of said flanges has a substantially vertical slot therein; a substantially vertical bore extending from the lower edge of each of said flanges into said slot; a lever arm having a vertically beveled end forming a cam face disposed between said flanges in juxtaposition to the lower surface of said pressure arm for operation thereof; an aperture through said lever arm adjacent said beveled end; a cam bolt extending through said slots in said flanges and said aperture in said lever arm; a pair of spacers disposed on each side of said lever arm and mounted on said cam bolt; adjustment screws threadedly engaging said bores and extending to said slots for adjustment of the position of said lever arm and said cam face thereof; whereby, adjustment of said screws determine the distance said cam face is set from said cable and therefore the amount of pressure applied to said cable by the upper surface of said pressure arm.